United States Patent

Hornung et al.

[11] Patent Number: 5,870,255
[45] Date of Patent: Feb. 9, 1999

[54] DEVICE FOR THE AUTOMATIC LOADING/ UNLOADING OF MAGNETIC DISKS

[75] Inventors: Stephan Hornung, Worms; Hubert Schuy, Oppenheim, both of Germany

[73] Assignee: International Business Machines Corporation, Armonk, N.Y.

[21] Appl. No.: 823,710

[22] Filed: Mar. 25, 1997

[30] Foreign Application Priority Data

Mar. 26, 1996 [DE] Germany .................. 196 11 896.4

[51] Int. Cl.$^6$ ..................................... G11B 5/54
[52] U.S. Cl. .............................................. 360/105
[58] Field of Search ............................................ 360/105

[56] References Cited

U.S. PATENT DOCUMENTS

| | | | |
|---|---|---|---|
| 5,148,339 | 9/1992 | Joshida | 360/105 |
| 5,189,575 | 2/1993 | Onooka et al. | 360/105 |
| 5,296,986 | 3/1994 | Morehouse et al. | 370/106 |
| 5,341,260 | 8/1994 | Jabbari | 360/105 |
| 5,394,281 | 2/1995 | Kajitani | 360/105 |
| 5,408,375 | 4/1995 | Asano | 360/105 |

FOREIGN PATENT DOCUMENTS

87/01853  3/1987  WIPO ............................ G11B 5/54

*Primary Examiner*—John H. Wolff
*Attorney, Agent, or Firm*—Noreen A. Krall

[57] ABSTRACT

A load/unload mechanism for magnetic disks is described which allows the magnetic heads of a disk drive to be loaded and unloaded at highest possible speed in a secure manner and without collision with the surface of the disk. The slider is lifted off directly in the vicinity of the flexure without causing abrasion between the suspension of the slider and the load/unload element.

10 Claims, 3 Drawing Sheets

DEVICE FOR THE AUTOMATIC LOADING/ UNLOADING OF MAGNETIC DISKS

BACKGROUND OF THE INVENTION

1. Field of the Invention

The invention relates to magnetic disk drives and, in particular, to a method and apparatus for automatic loading/ unloading of a magnetic head in such a magnetic disk drive.

2. Description of the Prior Art

In computer systems, information is frequently stored on a magnetic film on the surface of a magnetic disk (hard disk). Magnetic hard disk storage devices, that is to say assemblies of several such magnetic disks, either have permanently fixed disks or removable cartridges which can be removed from a disk storage device and inserted into the next device of the same type. These disks are not perfectly flat; but due to the manufacturing process, the disks have fine curvatures. Information is read and written by means of magnetic heads (sliders) which are connected to the housing of the disk storage device by means of a carrier structure. The magnetic heads, together with their suspensions, are mounted on the arms of the carrier structure, the actuator.

FIG. 1 shows a part of such an assembly according to the state of the art. The magnetic head suspensions themselves consist of the loadbeam, the flexure, and the mounting block, collectively referred to as the suspension. The mounting block serves as a connecting element between the actuator arm (not shown) and the magnetic head suspension. The loadbeam is the backbone of this suspension. It has a relatively high rigidity against the slider. Toward the rear, it has a controlled flexibility defined in production. In this area, bending of the loadbeam in z direction furnishes the cross-sectional profile with a defined rigidity. When the actuator is subsequently fitted in the disk storage device, this controlled rigidity of the bend zone in the fitting position produces a pressure load (gramload) of the slider on the surface of the disk.

The flexure is welded onto the loadbeam. The slider is then bonded onto a lug of the flexure. Due to its shape, the flexure has a very high lateral rigidity to prevent the slider from oscillating uncontrolledly in the event of rapid actuator movements. The rigidity around the transverse axis, on the other hand, is very low, to allow the slider to flex in response to the minutest unevenness on the disk. The entire assembly is referred to as the Head Suspension Assembly (HSA).

During read and write operations, the slider floats on a cushion of air at a very low height above the disk, which rotates very fast. The bearing surface onto the disk is termed the Air Bearing Surface (ABS). In this way, direct contact between the slider and the disk is avoided. If, for example, the rotational speed of the disk is too low to create an adequate air cushion between the head and the disk, the two may touch, resulting in a "head crash", which may cause irreparable damage to the disk and head and may lead to loss of data.

Especially in replaceable cartridge systems in which the magnetic disk is inserted into and withdrawn from the storage device housing inside a cartridge system, a mechanism is required to lift the magnetic heads off of the disk surface and set them to a rest position when the drive is not in operation. Otherwise, there would be very great danger of damage, in transit for example. However, a mechanism of this kind is also necessary in fixed systems, to prevent the head sticking to the disk at rest position.

In earlier times, it was usual to start and stop a magnetic disk, or magnetic disk storage device, by means of a Contact Start/Stop System (CSS). In this process, the drive is started and stopped while the magnetic disk and head are in contact with each other. To prevent the head and disk sticking together as already mentioned when the drive is at rest, the surface of the disk had to be appropriately roughened. Due to the increasing miniaturization of hard disks and hard disk storage devices, however, the gap between the actuator and the surface of the disk is becoming ever smaller, so that this solution no longer corresponds to the state of the art. As a result, it is becoming more and more problematic to unload the magnetic heads with mechanisms of sufficient strength. Also, reducing the size of gap means that the influence of production and assembly tolerances is becoming ever greater.

For this reason, load/unload mechanisms have been developed which lift the head from the disk using a load/ unload element (from now on, for the sake of simplicity, termed an unload element) when the disk is not rotating. When the disk is started again, i.e., the slider is brought back onto the disk surface, the appropriate air cushion must be reestablished fast enough to prevent contact between the disk and the head, dependent on the lifting speed of the head, the position of the ABS relative to the disk, and the defined height of flight of the head. Because users of such drives wish to read and write data very shortly after it starts operating, a mechanism of this kind must be furnished with the highest possible load/unload speed.

WO87/01853 discloses a load/unload mechanism for magnetic heads which has a comb-like structure as the unload element. The fingers of the element interact with the suspension of the magnetic heads to hold the heads at sufficient distance from the disk in the unloaded position. This device has the disadvantage that, due to its size, it can no longer be used for today's much more miniaturized magnetic disk drives.

U.S. Pat. No. 5,296,986 describes a device to hold the actuator of a disk drive in a secure position when the drive is at rest. For this, the slider is conveyed with the aid of a driver mechanism onto a ramp outside the magnetic disk, where it rests. The disadvantage of this device is that additional means such as cam followers are required to convey the head onto the ramp. Another disadvantage is that abrasion occurs in the contact zone between the ramp surface and the slider suspension. The abrasions very often take on magnetic properties due to changes in the grid structure. At the point at which such magnetic particles touch the disk surface, the data already written to it would be destroyed.

U.S. Pat. No. 5,394,281 describes a magnetic load/unload mechanism with a ramp as the unload element, having a piezoelectric element. In this mechanism, the static frictional force at the start of loading is replaced by a dynamic force. A magnetic solution of this kind has the disadvantage that the slider may drop out of control onto the surface of the disk, for example, if the power fails. Furthermore, this arrangement is not suitable for loading and unloading several magnetic heads simultaneously. In this case, coupling of several different transducers is not possible; and the available space for attachment of several such transducers is inadequate with today's low design heights.

A further disadvantage of the general state of the art is that when the suspension conveyed runs onto the unload element mounted outside the disk, the risk of collision between the magnetic head and disk is very great, for the following reason.

In production, the magnetic disk cannot be fully tested, i.e., the magnetic and mechanical properties are not precisely defined on the entire disk. Thus, due to technical factors, the outermost zone of the disk remains undefined. The consequence is the outer edge of the disk is much less flat than the zones further in. When the suspension is then moved onto the unload element with the disk rotating, the relative movement of the disk and the suspension causes the magnetic head to skew. This leads to a loss of flying height of the magnetic head and so to the risk of solid body contact between the head and the disk at the outermost, uneven, edge of the disk. For this reason, the suspension is normally unloaded in the outermost defined data field of the disk.

Accordingly, it can be seen that there is a need for a method and device for automatic loading and unloading of a magnet head over a disk surface in a magnetic disk drive which allows the magnetic heads of the drive to be loaded at the highest possible speed in a secure manner and without collision with the surface of the disk.

SUMMARY OF THE INVENTION

The object of the invention is, therefore, to furnish a load/unload mechanism which ensures fast and reliable loading/unloading of the magnetic head by means of a mechanical unload element, without need for additional means.

A further object of the invention is to provide a load/unload device which permits the slider to be raised directly on a level with the flexure.

A further object of the invention is to prevent abrasion between the suspension of the slider and the unload element.

These and other objects are accomplished by the device and the method in accordance with the present invention.

The device in accordance with the invention permits the slider to be raised and lowered at high speed, while the magnetic disk is rotating at nominal speed, without contact occurring between the slider and the surface of the disk. In this, the magnetic head is raised at the level of the flexure, i.e., directly at the head itself. The advantage of this is that the effective lift of the magnetic head at the level of the slider can be increased significantly, with a maximum permissible gramload loss in the same amount, in relation to an intervention positioned closer to the mounting block.

A further advantage is that no abrasion whatever occurs during loading/unloading. As a result, no particles can enter the air cushion between the slider and the disk and disturb the flight of the head, or even cause break-outs on the slider. The prevention of abrasion means that stainless steel can be used as the material for the unload element.

The device in accordance with the invention furthermore allows the distance, or thickness, of the unload element to be selected such that the unload element can still intervene cleanly between the suspension and the disk surface when the production and assembly tolerances of all components involved in the process add together in a worst-case scenario.

The possible vertical speed at which a magnetic head can be loaded onto the surface of the disk at nominal rotational speed is limited and must never be exceeded. Otherwise, the head will contact the disk surface. Since the surfaces of most disks are coated with a Carbon Overcoat (COC) to increase their intrinsic resistance to solid body abrasion, ensuring that the magnetic carrier layers underneath are not damaged in starting and stopping and in nominal operation, such contact would damage the COC layer. In the worst case, the magnetic layer underneath the overcoat may be damaged.

For this reason, it is highly advisable to load and unload the magnetic head using a mechanical force control. This can prevent the slider from dropping out of control onto the surface of the disk, for example, if the power fails to the disk storage device. Another lifting mechanism, such as a magnetic one, is possible but is not beneficial for the reasons cited.

BRIEF DESCRIPTION OF THE DRAWINGS

Referring now to the drawings in which like reference numbers represent corresponding parts throughout.

DETAILED DESCRIPTION OF THE INVENTION

Figure 1:
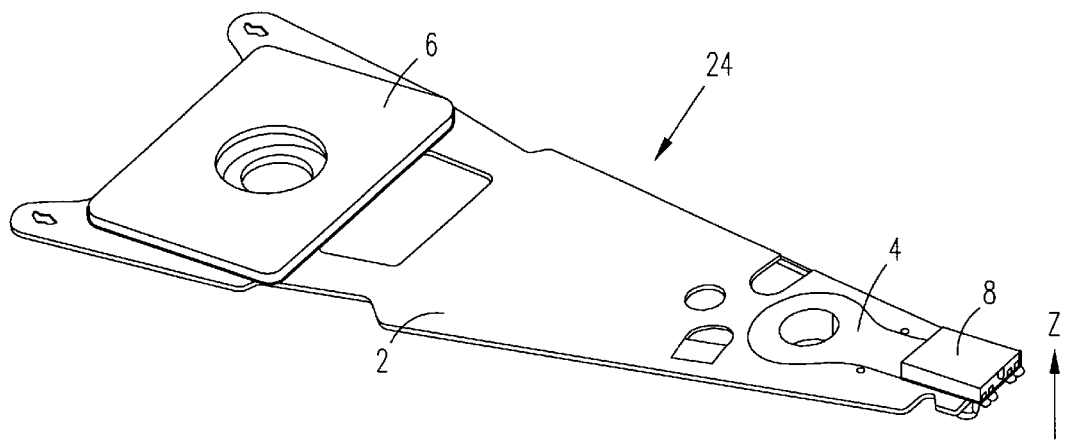
FIG. 1 shows a schematic of a Head Suspension Assembly (HSA)
Figure 2:
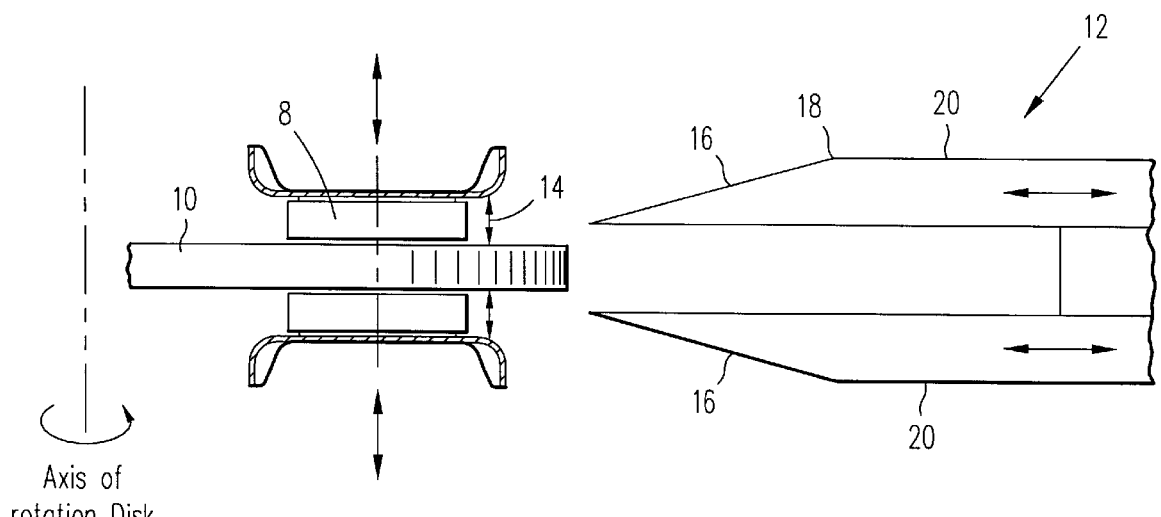
FIG. 2 shows a schematic side view of the device in accordance with the invention in normal operation.
Figure 3:
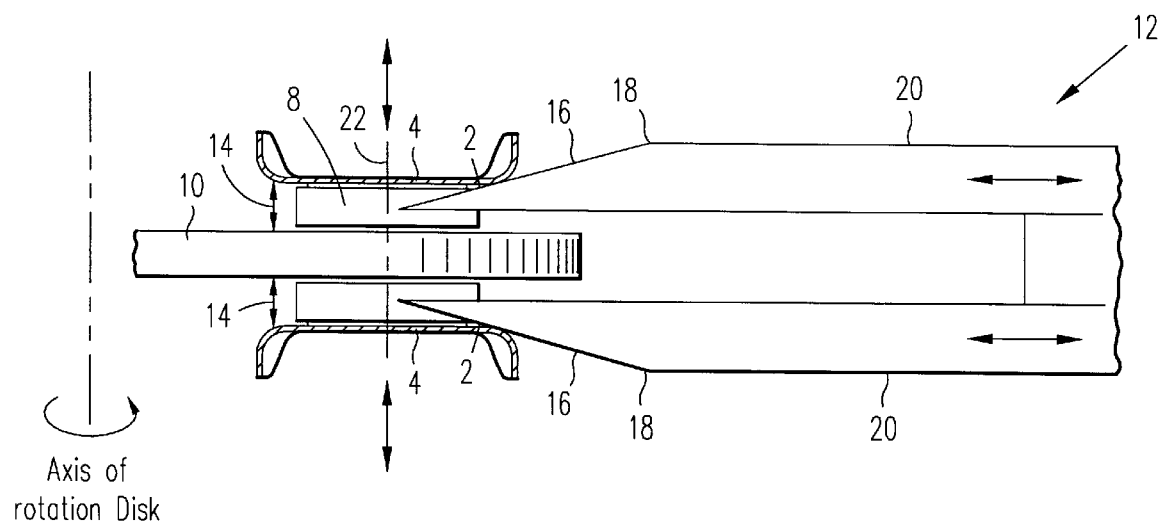
FIG. 3 shows a side view of the device in accordance with the invention during unloading.
Figure 4:
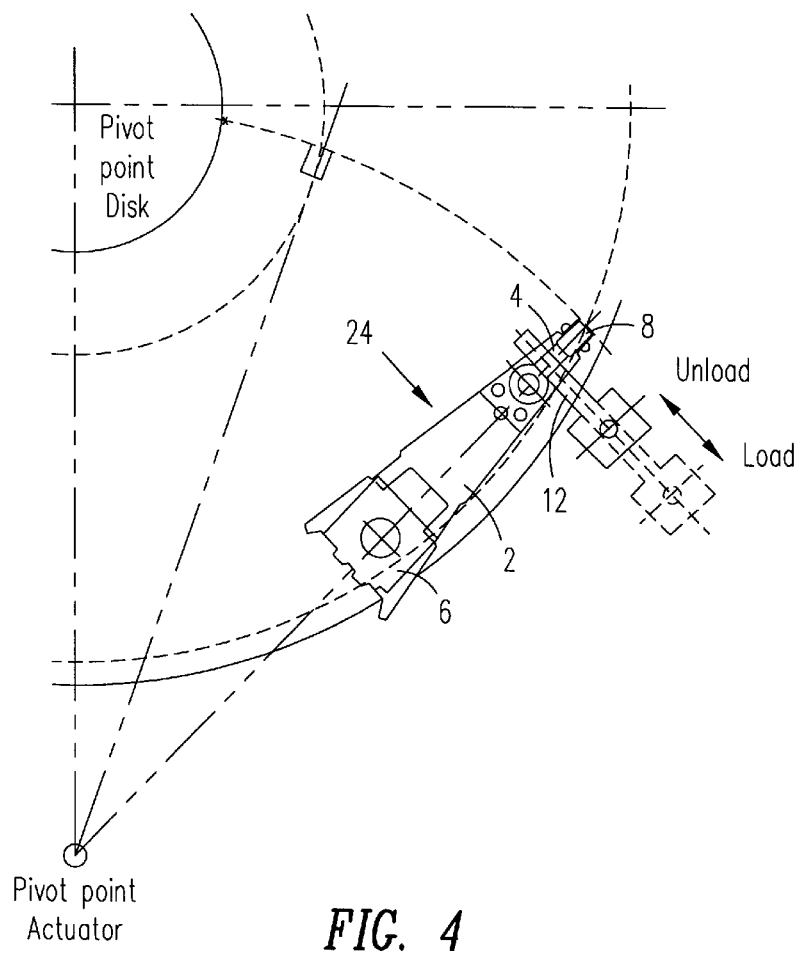
FIG. 4 shows a plan view of the device in accordance with the invention.

As can be seen from FIG. 2, in normal operation, the magnetic head 8 is loaded on the disk 10 and flies at nominal height with the disk rotating at nominal rotational speed. The unload element 12 is completely outside the surface of the disk at this point in time. FIG. 2 shows a wedge-shaped unload element 12 having a horizontal 20 and a sloped 16 portion. This shape has proved particularly advantageous, among other reasons, due to the severely restricted access area of the mechanism in z direction (see FIG. 1). It should be pointed out that the invention is not limited to unload elements 12 which contact both sides of the magnetic disk simultaneously. The mechanism presented can, of course, also function when the magnetic head 8 is only arranged on one side of the disk.

When the magnetic head 8 is to be raised from the disk surface, the wedge-shaped unload elements 12 are conveyed transversely at high speed into the gap 14 between the magnetic head suspension 24 and the surface of the disk 10, for example, with the normal current of the actuator drive motor. This causes the wedges to raise the magnetic head suspension 24 with their sloped portion areas 16 when they contact the loadbeam edges 2. At this moment, the magnetic head 8 is forced also to begin lifting from the disk surface. As it moves further in under the suspension 24, the wedge reaches the convex edges of the flexure 4, the transition zone 18 between the sloped portion 16 and the horizontal section 20. Once more, this raises the head 8 on a level with the intervention zone by the amount of flexure 4 thickness.

As already set out above, bending of the loadbeam in positive z direction (see FIG. 1) furnishes the cross-sectional profile with a defined rigidity, resulting in a defined gramload which, in nominal operation, presses the magnetic head 8 onto the air cushion and thus holds it at a nominal height of flight.

Figure 5:
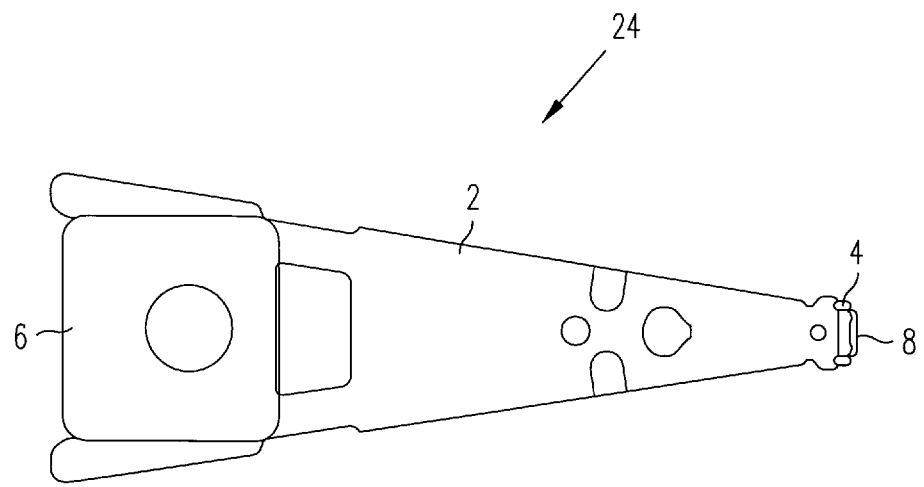
FIG. 5 shows a graph of the dependency of gramload on the point of intervention of the unload element.
Figure 5:
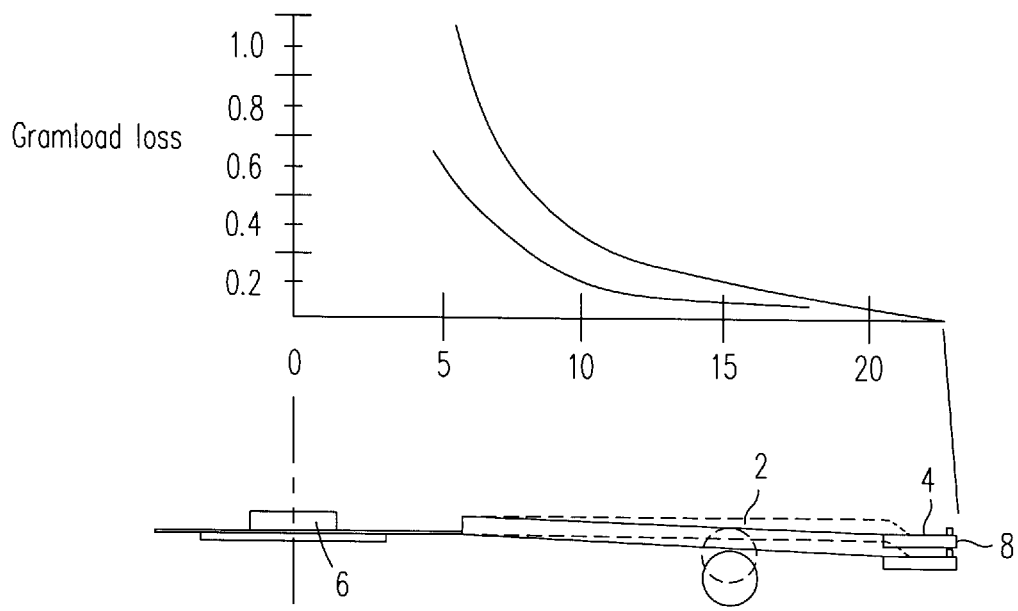

If, when the magnetic head 8 is lifted by means of unload elements 12, the suspension 24 is subsequently bent in negative z direction, a gramload loss occurs once, dependent on the force action on the loadbeam 2 and on the amount of deflection. As can be seen from FIG. 5, this gramload loss, with equal deflection, is lower when the load is applied close to the magnetic head 8, while becoming almost uncontrollably high when force is applied closer to the mounting block 6. However, any loss of gramload brings about an increase in height of flight, and, thus, a weakening of the read/write signal. Therefore, to achieve the lowest possible loss of gramload in a load/unload process, intervention of the unload element 12 should be as close as possible to the level of the flexure 4.

In this unload operation, the wedge moves under the suspension 24 until its horizontal level reaches the axis of symmetry 22 of the suspension. This ensures that the magnetic head is not rotated around its own axis when raised. This means that no permanent deformation of the loadbeam around its longitudinal axis of symmetry occurs, and, thus, no change in height of flight. Then, the magnetic head suspension lying on the horizontal portion of the load element is pivoted out of the plane of the magnetic disk with the load element.

In the load operation, the interaction between the movement of the wedge and that of the magnetic head 8 is the reverse of the interaction which occurs in the unload operation. The only difference is the lower amount of work consumed by friction when the ramp 16 of the wedge contacts the edge of the flexure 4 during loading.

In the load/unload operation, the intervention of the wedge outside the suspension axis of symmetry rotates the HSA relative to ideal zero by a certain amount, i.e., for a fraction of the load/unload time the slider makes contact with only one side. For this reason, the load/unload speed can only be increased to the extent that the air cushion under the slider ABS can still be built up within fractions of a second even when, temporarily, contact is provided by only a part of the overall contact area.

In most common suspensions 24, for cost reasons, the flexure 4 is welded onto the loadbeam 2 such that it lies on it in a convex form. It should be pointed out here that the present invention is not restricted to such suspensions 24. Since the flexures 4 are produced by a metal-etching process, the edges are extremely sharp. Also, the flexure material is by nature very hard.

If an attempt is now made, as shown in the present invention, to unload the magnetic head 8 directly in front of the slider on a level with the flexure 4 using a wedge element, the said sharp edges of the ramp area of the wedge are automatically positioned in the way. As a result, with purely solid body friction, severe abrasion occurs in the contact zone of the flexure edge. Depending on the roughness of the surface and on the structure and hardness of the suspension and wedge element, abrasion may even occur in the contact zone of the loadbeam.

In an especially advantageous embodiment of the invention, an additional hydrodynamic sliding film is therefore built up on the load/unload element 12 using a lubricant, such as perfluoropolyether.

The device described here permits the magnetic head 8 of a magnetic disk drive to be unloaded at the highest possible speed, without solid body contact between the head and the surface of the disk.

By the use of a lubricant, in spite of these properties, suspensions 24 can still be unloaded on a level with the flexure 4, even where the flexures of said suspensions 24 have been welded onto a flat bearing surface of the loadbeam 2 and consequently protrude from the loadbeam 2 with their sharp edges, without the unload operation causing abrasion in the contact zone between the unload element 12 and the suspension 24. Avoiding abrasion also means that no particles caused by the load/unload process can enter the air cushion between the slider ABS and the surface of the disk 10 and disturb the flight of the head 8, or even cause break-outs on the slider.

Due to the fact that no such abrasion occurs, stainless steel can be used as the material for the unload element 12. This means the unload element 12 can be of such strength and elasticity that even very thin structures and, possibly, structures tapering toward the magnetic disk 10 can withstand the high loads with very early intervention. The use of steel also increases rigidity, especially of a wedge-shaped unload element 12. As a result, the deflection values are kept low, even with high vertical loads, and the wedge is never deflected so severely that, at a short distance from the disk surface, it would touch the surface under the loads of the load/unload process.

The fact that the magnetic head 8 can be raised on a level with the flexure 4 directly in front of the slider means that the effective lift of the head 8 can be increased significantly, with a constant maximum permissible gramload loss, in relation to an intervention positioned closer to the mounting block. The mechanism presented also serves as a locking mechanism for the magnetic heads 8 when the disk 10 is at rest and the heads 8 are raised.

A further advantage is that, as a result of the avoidance of abrasion between the magnetic head suspension 24 and the load/unload element 12, thermal asperities can be avoided which occur when the slider comes into frictional contact with solid bodies on a level with the read/write element.

What is claimed is:

1. A device for the automatic loading/unloading of at least one magnetic head fixed to a head suspension comprising:

a wedge-shaped load/unload element further comprising a horizontal portion and a sloped portion extending from the horizontal portion;

wherein during the unload operation the load/unload element can be conveyed perpendicular to an axis of rotation of a disk into a space between the suspension and a surface of the disk, such that it lifts the at least one magnetic head off the magnetic disk and that during the load operation the load/unload element can be conveyed out of the space such that the at least one magnetic head is lowered onto the magnetic disk.

2. The device for the automatic loading/unloading of the at least one magnetic head fixed to the suspension as set forth in claim 1, wherein the load/unload element can be conveyed into said space in the immediate vicinity of the magnetic head.

3. The device for the automatic loading/unloading of the at least one magnetic head fixed to the suspension as set forth in claim 2, wherein the load/unload element can be conveyed into said space to the extent that the horizontal portion comes into contact with the axis of symmetry of the magnetic head suspension.

4. The device for the automatic loading/unloading of the at least one magnetic head fixed to the suspension as set forth in claim 3, wherein the load/unload element is comprised of stainless steel.

5. The device for the automatic loading/unloading of the at least one magnetic head fixed to the suspension as set forth in claim 4, wherein the load/unload element comprises a hydrodynamic sliding film affixed to said load/unload element by means of a lubricant.

6. The device for the automatic loading/unloading of the at least one magnetic head fixed to the suspension as set forth in claim 5, wherein the lubricant is a perfluoropolyether.

7. A method for the unloading of at least one magnetic head in a magnetic disk drive comprising the steps of:

conveying a load/unload element into a space between a suspension and a surface of a rotating magnetic disk until a horizontal portion of said load/unload element is in contact with an axis of symmetry of said suspension, whereby the magnetic head is lifted off the magnetic disk and rests on said horizontal portion of said load/unload element; and rotating the lifted magnetic head out of the plane of said magnetic disk.

8. A method for the loading of at least one magnetic head in a magnetic disk drive comprising the steps of:

rotating a magnetic head resting on a horizontal portion of a load/unload element into the plane of a magnetic disk; and conveying said load/unload element out of a space between a suspension and the surface of the rotating magnetic disk, whereby the suspension slides along a sloped portion of said load/unload element and said magnetic head is lowered onto said magnetic disk.

9. A method for the loading/unloading of at least one magnetic head in a magnetic disk drive comprising the steps of:

rotating a magnetic head resting on a horizontal portion of a load/unload element into the plane of a magnetic disk;

conveying said load/unload element out of a space between a suspension and the surface of the rotating magnetic disk, whereby the suspension slides along a sloped portion of said load/unload element and said magnetic head is lowered onto said magnetic disk;

conveying a load/unload element into the space between the suspension and the surface of the rotating magnetic disk until the horizontal portion of said load unload element is in contact with the axis of symmetry of said suspension, whereby the magnetic head is lifted off the magnetic disk and rests on said horizontal portion of said load/unload element; and rotating the lifted magnetic head out of the plane of said magnetic head.

10. The method in accordance with claim 9, wherein said load/unload element is conveyed into said space in the immediate vicinity of said magnetic head.

* * * * *